United States Patent [19]

Zeigler

[11] Patent Number: 5,130,397
[45] Date of Patent: Jul. 14, 1992

[54] HYBRID SOL-GEL OPTICAL MATERIALS

[75] Inventor: John M. Zeigler, Albuquerque, N. Mex.

[73] Assignee: The United States of America as represented by the United States Department of Energy, Washington, D.C.

[21] Appl. No.: 479,136

[22] Filed: Feb. 13, 1990

[51] Int. Cl.$^5$ .............................................. C08K 3/34
[52] U.S. Cl. ...................................... 528/9; 528/34; 528/395
[58] Field of Search .............................. 528/34, 9, 395

[56] References Cited

U.S. PATENT DOCUMENTS

| | | | |
|---|---|---|---|
| 4,073,967 | 2/1978 | Sandvig et al. | 528/395 |
| 4,587,205 | 5/1986 | Harrah et al. | 430/326 |
| 4,588,801 | 5/1986 | Harrah et al. | 528/33 |
| 4,761,464 | 8/1988 | Zeigler | 528/33 |
| 4,814,017 | 3/1989 | Yoldas et al. | 528/395 |

OTHER PUBLICATIONS

J. Zeigler, "Polysilanes-Prototypical σ-Conjugated Polymers", Synthetic Metals, vol. 28, 1989, pp. 581-591.

J. Zeigler et al., "Self-Developing Polysilane Deep-UV Resists-Photochemistry, Photophysics, and Submicron Lithography", SPIE Advances in Resist Tech. & Process II, vol. 539, 1985, pp. 166-174.

G. Wilkes et al., "New Inorganic-Organic Hybrid Materials Through The Sol-Gel Approach", Silicon-Based Polymer Science: A Comprehensive Resource, Chapter 12, pp. 207-226.

H. Schmidt, "Organically Modified Silicates As Inorganic-Organic Polymers", Inorganic & Organometallic Polymers, Chap. 27, pp. 333-344.

R. West et al., "Polysilanes as Photoinitiators For Vinyl Polymerization", Journal of Radiation Curing, vol. 35, No. 1, Jan. 1986, pp. 35-40.

C. Brinker et al., "Sol-Gel Transition In Simple Silicates II", Journal of Non-Crystalline Solids, vol. 63, 1984, pp. 45-59.

J. Mark et al., "Simultaneous Curing and Filling of Elastomers", Macromolecules, 1984, vol. 17, No. 12, pp. 2613-2616.

C. Carlson et al., "Formation & Rearrangement of Sulfur-Insertion Products of Octaethylcyclotetrasilane", Organometallics, vol. 2, No. 12, 1983, pp. 1798-1801.

K. Oka et al.,"Reaction of Dodecamethylcyclohexasilane With Thionyl Chloride, Formation of α,ω-Dichloropermethylpolysilanes [Cl(Me2Si)nCl, n=2, 3, 4, and 6]", Chemistry Express, vol. 2, No. 11, 1987, pp. 699-702.

D. Schaefer et al., "Fractal Geometry of Silica Condensation Polymers", Physical Review Letters, Oct. 1, 1984, vol. 53, No. 14, pp. 1383-1386.

H. Huang et al., "New Hybrid Materials Incorporating Poly(tetramethylene Oxide) Into Tetraethoxysilane-Based Sol-Gel Glasses" A New TEOS-PTMO Hybrid System, Chapter 29, pp. 354-376.

H. Watanabe et al. "The Ring Opening Reaction of Cyclopolysilanes (R2Si)n (n=3-6), With Iodine, A Kinetic Study", Bull. Chemical Society Japan, vol. 60, No. 2, 1987, pp. 769-770.

C. Carlson et al., "The Perethylcyclopolysilanes (Et2-Si)4 Through (Et2Si)8", Organometallics, 1983, vol. 2, No. 12, pp. 1792-1797.

C. Carlson et al., "Ring-Insertion & Ring-Opening Reactions of Octaethylcyclotetrasilane", Organometallics, 1983, vol. 2, No. 12 pp. 1801-1807.

D. Ulrich, "Chemical Processing of Ceramics", C&EN Air Force Office of Scientific Research, Jan. 1, 1990, pp. 28-40.

Primary Examiner—John C. Bleutge
Assistant Examiner—M. W. Glass
Attorney, Agent, or Firm—Armand McMillan; James H. Chafin; William R. Moser

[57] ABSTRACT

Hybrid sol-gel materials comprise silicate sols crosslinked with linear polysilane, polygermane, or poly(silane-germane). The sol-gel materials are useful as optical identifiers in tagging and verification applications and, in a different aspect, as stable, visible light transparent non-linear optical materials. Methyl or phenyl silicones, polyaryl sulfides, polyaryl ethers, and rubbery polysilanes may be used in addition to the linear polysilane. The linear polymers cross-link with the sol to form a matrix having high optical transparency, resistance to thermooxidative aging, adherence to a variety of substrates, brittleness, and a resistance to cracking during thermal cycling.

30 Claims, 1 Drawing Sheet

HYBRID SOL-GEL OPTICAL MATERIALS

The government has rights in this invention pursuant to Contract No. DE-AC04-76DP00789 between the United States Department of Energy and AT&T Technologies, Incorporated.

BACKGROUND OF THE INVENTION

This invention relates to sol-gel related materials useful as carriers for optical identifiers in verification applications, to materials useful for coating or encapsulating, to novel, transparent non-linear optical materials and to ceramics.

A need exists for optically clear matrix materials which can suspend reflective particles for use as optical identifiers in verification applications, e.g., tagging of weapon components. Optical identifiers of this type must display unique optical signatures which can be used in identifying and verifying the authenticity of an object. Such applications typically demand a material with high optical transparency, extreme resistance to thermooxidative aging, good adherence to a variety of substrates, particularly metal oxides, a high degree of brittleness to thwart attempts to illicitly remove or transfer the tag, and sufficient mechanical stability to avoid cracking during thermal cycling, among other properties.

Sol-gels (materials formed by hydrolyzing orthosilicate esters, $Si(OR)_4$, with water under either acidic or basic conditions) substantially meet the above criteria except the last thermal cycling criterion; they tend to crack readily, causing problems such as providing false positives for tampering and delamination from the substrate. FIG. 1 is a simplified theoretical representation of a matrix 1 of polymer chains of such a sol-gel. The sol-gels bond well to substrates such as composite surfaces, metals and metal oxides. These characteristics would make sol-gels useful as tags for rocket engines, missiles and a variety of other applications, in the absence of the above identified problems.

Hybrid silicone and organic sol-gel-like materials are also known, e.g., as disclosed in Wilkes, et al., *Silicon-Based Polymer Science: A Comprehensive Resource*, Advances in Chemistry, Vol. 224, J. M. Zeigler and G. Fearon, Eds., American Chemical Society, Washington, D.C., 1990, p. 207 and in Schmidt, *ACS Symp. Ser.*, 360, 333 (1988). FIG. 2 is a simplified theoretical representation of a matrix of a sol-gel-like structure 21 having rubbery polymers 22 bonded therein. These materials may be useful in tagging applications (i.e., as identifiers in verification applications), but they have an inherent disadvantage in that they must be formed into gels, loaded homogeneously with reflective particles to provide an optical signature, and applied on site. The application of such a gel in a uniform manner is a difficult, if not impossible, task, especially for non-technical field personnel carrying out a tagging operation which must result in a tag having substantially no cracks.

In a different aspect, sol-gel like materials might also be attractive in non-linear optical applications (e.g. waveguides, optoelectronics) if they had sufficiently high optical nonlinearities. Prior art sol-gel materials do not exhibit useful nonlinearities, but the many favorable properties of sol-gels for optical verification schemes also make the materials attractive for this type of use. The problem that must be solved for these materials to find application in this area is to provide a means of incorporating structures with a high optical nonlinearity in the sol-gel while preserving its useful optical, chemical, and physical properties. This has not been achieved to date in the prior art.

Sol-gel processed optical waveguides based on the $\pi$-conjugated, carbon-based polymer poly-p-phenylenevinylene produced in situ in a tetramethylorthosilicate (TMOS) sol-gel have been prepared by Karasz and Prasad and mentioned in a recent review (D. R. Ulrich, *Chemical and Engineering News*, Jan. 1, 1990, pp. 28–40]. These composites are said to have "low" optical loss, stemming from absorption of the propagating light beam by the PPV part of the composite. PPV is known to have a strong absorption in the visible spectral regime, unlike the $\sigma$-conjugated, silicon and/or germanium-based materials of this invention, which have no significant visible light absorption, even as pure polymers, and proportionately less when present in the sol-gel hybrid. In addition, $\pi$-conjugated polymers like PPV have relatively poor thermooxidative stability and mechanical properties. The high stability and improved mechanical properties of the polysilanes and related materials of this invention, thus, is another advantage of the current materials over those of the prior art.

SUMMARY OF THE INVENTION

It is an object of the present invention to provide a process for preparing an optical identifier (e.g. tag) having good optical transparency, resistance to thermooxidative aging, adherence to a variety of substrates, a high degree of brittleness and a resistance to cracking during thermal cycling. It is another object of the present invention to provide an optical identifier having such properties.

It is further an object of the present invention to provide an identifier having hybrid sol-gel properties and which can be readily and reproducibly applied on site.

It is further an object of the present invention to provide a verification material having easy processibility.

It is further an object of the present invention to provide a nonlinear optical material transparent to visible light having high thermooxidative stability and exhibiting substantially no scattering of light.

It is further an object of the present invention to provide sol-gel hybrid materials having applicability in ceramics, polymer chemistry, coatings, optoelectronics, photoplating and encapsulation.

The present invention is directed to a process comprising polymerizing an orthosilicate ester with a linear polysilane or related polygermane or copolymers thereof. In one of its aspects, the present invention further relates to a process as described above, further comprising photolyzing the products of the polymerization to produce a cross-linked sol-gel. In another different aspect, the present invention further relates to the provision of novel, high stability non-linear optical materials having no absorption in the spectral regimes from the near UV to the near infrared (wavelengths from about 350 nm to about 2500 nm) and low absorption from 200 to 350 nm. Such materials will be particularly well suited to the formation of waveguides, for example.

The present invention is further directed to a UV-curable sol-gel hybrid and a cross-linked sol-gel produced by the photochemical processes described above.

The invention may be more fully understood with reference to the description which follows. The invention should be recognized as contemplating all modifications within the skill of an ordinary artisan.

DETAILED DESCRIPTION OF THE INVENTION

According to the present invention, polysilanes or functionally similar polygermanes or the corresponding silanegermane copolymers are incorporated into a sol-gel network. In the course of this description, the term polysilane will be used for illustrative purposes, but this term is to be interpreted as including the germane polymers and the silane-germane copolymers within its contemplated scope. Incorporation of the polysilanes may be accomplished via any of a variety of mechanisms. It is desirable in most applications to provide a homogeneous network matrix so as to minimize light scattering, although inhomogenous networks can be achieved and are considered as equivalents within the scope of the invention. Upon application of UV radiation to the polysilanes, the, polysilanes convert mainly to polysiloxanes by reacting with either atmospheric $O_2$ (vide Zeigler, et al, *SPIE Adv. In Resist Tech. and Proc.*, 539, 166 (1985)), hydroxyls derived from hydrolysis of the orthosilicate precursor, and hydroxyls on surfaces being tagged. As a result of this conversion, the matrix is cross-linked from a liquid or gelatinous state to a hard state.

While not wishing to be bound by any particular theory, it is believed that silyl radical intermediates produced on photolysis cause a cross-linking of the sol-gel by conversion of the polysilane Si-Si bonds to Si-O bonds via various mechanisms which either cross-link to the silicate network or bond to other Si-O bonds to form siloxanes. High structural stability and integrity is achieved when the majority of Si-Si bonds are converted to Si-O bonds. This may not be desirable, however, for some applications. For example, non-linear optical applications will demand a substantially photostable material in which the Si-Si bonds remain substantially intact.

Reactions to produce hybrid sol-gel materials of the present invention can be written as follows:

(1)

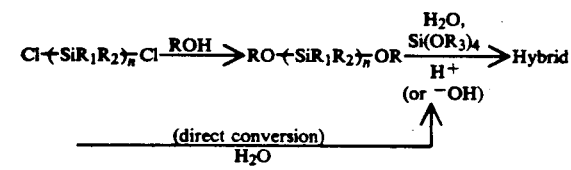

(2)

-continued

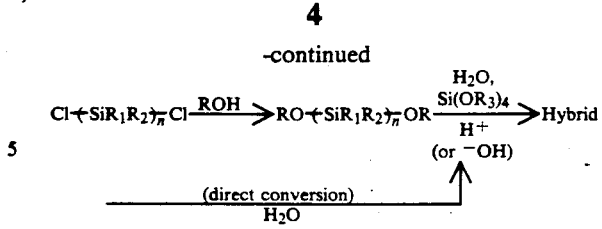

 (3)

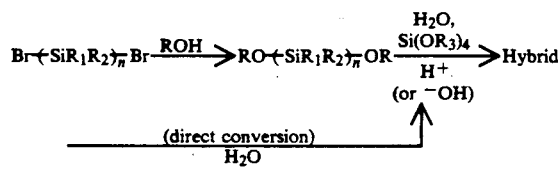

wherein n is preferably between 3 and 100, R represents an alkyl or aryl group, $R_1$ represents an alkyl, aryl or silyl group, $R_2$ represents an alkyl, aryl, or silyl group, and $R_3$ represents an alkyl, aryl, or silyl group and is preferably a methyl or an ethyl group. Preferably, R is an alkyl group. $R_1$ and $R_2$ may be an alkyl, aryl, or silyl group depending upon a desired application. To obtain photocurable materials $R_1$ and $R_2$ are preferably either alkyl or silyl. Photostable nonlinear optical materials will preferably have at least one of $R_1$ and $R_2$ be aryl.

Figure 1:
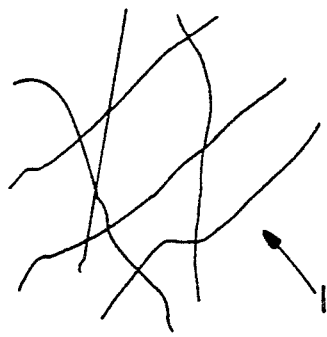
FIG. 1 is a schematic diagram of a prior art sol-gel network.
Figure 1:
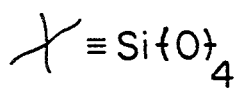
Figure 2:
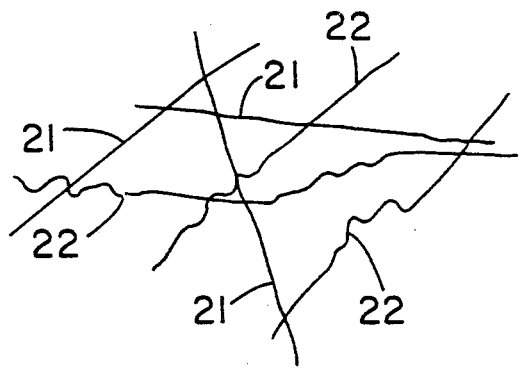
FIG. 2 is a schematic diagram of a prior art hybrid sol-gel-like network.
Figure 2:
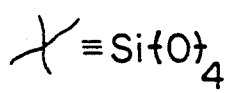
Figure 3:
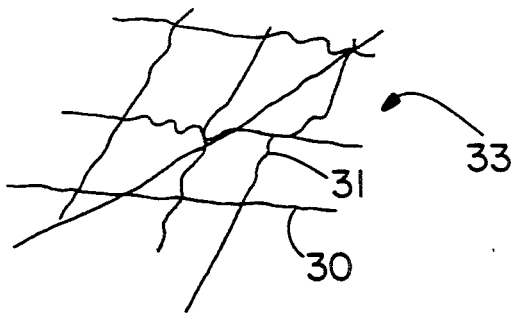
FIG. 3 is a schematic diagram of a hybrid sol-gel network in accordance with the present invention.
Figure 3:
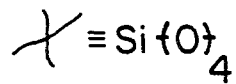

FIG. 3 is a simplified theoretical, representation of a hybrid sol-gel network according one aspect of to the present invention. network comprises a sol-gel network 30 having polysilane chains 31 bonded therein. Polysiloxane chains and crosslinks are formed by photolyns of these polysilanes.The sol-gel preferably comprises a silicate sol. Most preferably the sol comprises hydrolyzed orthosilicate esters, although mixed silicate/titanate gels will have similar properties and are contemplated as within the scope of this invention.

The length n of the linear polysilanes to be incorporated into the sol-gel is preferably between 3 and 100 silicon atoms although longer chains may be used. Longer chains provide linear-like polymer heavier and larger nonlinear optical (NLO) responses and are thus, more suitable for NLO applications such as waveguides. Shorter chains provide more sol-gel-like properties and are therefore most desirable for tagging applications. The polysilane fragments can be derived from polysilanes containing between 5 and 7 silicon atoms in a cyclic configuration. Such cyclic polysilanes are readily available as by-products from Wurtz-type synthesis of high molecular weight polysilanes or by direct synthesis methods of the prior art. The rings readily open to provide a linear polysilane chain upon treatment with halogens or their synthetic equivalents. Cyclic polysilanes are also less expensive than longer chain polysilanes, since they are common by-products. If desired, the long chain polysilanes are most readily obtained by the methods of Zeigler, U.S. Pat. Nos. 4,588,801, 4,761,464, and 4,587,205, the disclosures of which are hereby incorporated by reference.

The selection of alkyl versus aryl versus silyl groups for $R_1$ and $R_2$ is very important when providing a matrix of a desired photosensitivity. The use of alkyl or silyl groups for $R_1$ and $R_2$ provide a hybrid matrix of high photosensitivity and significant absorption at wavelengths shorter than about 350 nm. These characteristics are desirable in tagging and verification applications. When one or both of $R_1$ and $R_2$ are aryl, a material of relatively high photostability is obtained; these hybrids are the ones most suitable for non-linear optical applications.

Suitable organo groups on the silyl side groups or on the main chain of the polysilane portion of the hybrids of this invention are very broad in nature and will be chosen to provide sol-gel hybrid materials having utilitarian properties such as those discussed above.

Suitable organo groups for $R_1$ and $R_2$ include aliphatic and aromatic groups, typically hydrocarbon in nature, non-hydrocarbons also being suitable. The groups may be saturated or unsaturated, substituted or unsubstituted. Typical non-limiting examples of suitable organo groups include $C_{1-15}$-alkyl, $C_{2-7}$-alkylene, $C_{3-15}$-cycloalkyl, $C_{6-14}$ aryl, $C_{7-20}$-aralkyl or $C_{7-20}$-alkaryl. Organo groups in the side chain silyl groups also include organosilyl and poly(organosilyl). The alkyl portions in each of the organo groups include, as appropriate, methyl, ethyl, n-propyl, i-propyl, n-butyl, i-butyl, sec-butyl, t-butyl, as well as any of the pentyl, hexyl, heptyl, octyl, nonyl, decyl, undecyl, dodecyl, tridecyl, tetradecyl and pentadecyl groups. Suitable aryl portions include phenyl, naphthyl, etc. Suitable cycloalkyl groups include cyclopropyl, cyclobutyl, cyclopentyl, cyclohexyl, cycloheptyl, cyclooctyl, adamantyl, etc. Suitable arylalkyl groups include benzyl, phenethyl, phenylpropyl, etc.; suitable alkaryl groups include tolyl, xylyl, etc.

The organo groups can also be substituted, e.g., by $C_{1-8}$-alkyl, $C_{1-8}$-alkoxy, $C_{6-10}$-aryl, mono- or di($C_{1-6}$-alkyl)-amino, $C_{2-8}$-alkanoyl or a corresponding ketal, amino, hydroxy, $C_{2-8}$-alkanoyloxy, etc. As with the organo groups per se, the nature of the substituents, if any, will not be critical and will be determined by the properties desired for a particular end use.

Also included within the scope of organo groups of this invention are heterocyclic groups, e.g., aliphatic or aromatic heterocyclic groups of 1-3 fused rings, each containing 4-7 ring atoms, 1-3 of which in each ring are O, N or S or even Si, the remainder being C-atoms. Suitable heterocyclic rings include morpholinyl, piperidinyl, pyridyl, etc. For other suitable hetero groups see, e.g., U.S. Pat. No. 4,761,464, which is entirely incorporated by reference herein.

Preferred organo groups on the silyl substituent include methyl, ethyl, n- or i-propyl, t-butyl, cyclohexyl, phenyl, phenyl-$C_{1-3}$-alkyl, or $C_{1-3}$-alkylphenyl. The most preferred organo group on the silyl groups is methyl, e.g., trimethylsilyl is a preferred silyl group. The silyl groups can also be branched, i.e., substituents on the silyl groups include organo silyl groups or poly(organosilyl) groups. Thus, suitable silyl groups include $Si(R_4)(SiR_5)_2$, where the R groups are organo groups, most preferably methyl but also other silyl groups.

The foregoing discussion of suitable groups is not meant to be precisely limiting and substituents structurally related to those above are contemplated as equivalents within the scope of this invention.

According to the present invention, the orthosilicate esters preferably contain alkyl groups as their R groups. Aryl groups including phenyl may also be used. Alkyl groups more easily break from the silicon, are less expensive than aryl substituents, and form higher volatility by-product alcohols which are more easily expelled from the hybrid structure. Most preferably, R is either methyl or ethyl. Tetramethyl orthosilicate (TMOS) and tetraethyl orthosilicate (TEOS) are thus preferred. The hybrid sol-gel may be formed by hydrolyzing orthosilicate esters in the presence of the suitably terminated linear silane polymer with water under either acidic or basic conditions. Preferably, acidic conditions are used in verification technology. The sols are preferably non-gelatinous and have a low cross-link density for use as UV-curable matrix materials. For non-linear optical applications, formation of the hybrid under base catalysis is acceptable.

Different wavelengths of UV radiation may be used to photolyse the polysilanes depending upon the degree of crosslinking desired. If a lightly cross-linked matrix is desired, wavelengths on the low energy side of the polysilane absorption band should be used. This limits the extent of crosslinking due to the molecular weight dependence of the polysilane absorption. For optical identifiers, polysilane chains are preferably built into a non-gelatinous soluble silicate sol having a low cross-link density. If a highly cross-linked matrix is desired, or if it is desirable to convert all the Si-Si bonds to Si-O bonds, higher energy wavelengths should be used (e.g. around 250 nm). Wavelengths on the high energy side of the polysilane absorption band and particularly on the order of 250 nanometers are preferred for such applications.

In an alternative preferred embodiment of the present invention, aryl groups are used as the $R_1$ and/or $R_2$ substituents. Aryl substituted polysilanes provide a material of high photostability and low absorption at visible wavelengths, as preferred for nonlinear optical applications. Simple dispersion of linear polysilanes in a sol-gel matrix to form non-linear optical materials is unsuccessful due to incompatibility with the sol-gel matrix. A non-homogeneous mixture is formed wherein the polysilane and sol-gel phases segregate. This phase separation provides a heterogeneous mixture which scatters light, an undesirable characteristic for optical applications. The use of bonded-in aryl-material substituted polysilanes overcomes this problem by providing a material of high photostability and low absorption which cannot phase separate due to the covalent bonding of the polysilane with the matrix.

According to an embodiment of the present invention, di-halogenated polysilanes may be used as precursors to the linear polysilane segments in the hybrid matrix. In particular, chlorine and bromine substituted polysilanes are preferred. More preferably, the halogens are substituted with alkoxy groups as shown in reactions 1-3 above. The alcohol used to provide the alkoxy group may be an alkyl or an aryl alcohol, alkyl alcohols being more preferred. Most preferably, methanol or ethanol is used. This helps assure similar reactivity with that of TMOS or TEOS (tetraethylorthosilicate), giving the most uniform incorporation into the matrix. Polysilanes having alkoxy substituted groups are more controllably incorporated into the sol-gel due to this fact. Also, silicon-alkoxy bonds give less corrosive by-products than silicon-halogen bonds on hydrolysis. After the halogens are replaced with the alkoxy groups, the polysilane is preferably distilled to pure form and then mixed with the sol-gel under hydrolysis conditions, although polysilanes of different chain lengths (i.e., mixtures) may also be employed successfully. Most preferably, they are hydrolyzed with water under acidic conditions.

In alternative embodiments, more complex structures may be used. These structures may have one or more rubbery polymers in addition to polysilane chains bonded to a matrix. Preferably, the rubbery polymers are bonded to Si-O bonds in or cross-linked to the silicate network. Specific polymers may be chosen depending upon what properties of interest need be provided. For tagging applications, materials with high thermo-oxidative stability are preferably used as the linear polymer component. These linear polymers include methyl or phenyl silicones, polyaryl sulfides, polyaryl ethers, and rubbery polysilanes. Thus, cohydrolysis of TEOS or TMOS, a dialkoxy-terminated linear polysilane, and a dialkoxy or dihydroxy terminated silicone would provide a UV-curable sol-gel matrix with greater rubbery character.

The use of polysilanes as incipient sources of siloxanes has more general applicability in ceramics, polymer chemistry, coatings, photopatterning, optical materials and other fields. Although polysilane-based matrices may be preferred for cost reasons, matrices having polygermane chains or co(silane-germane) chains behave in qualitatively similar fashion to the polysilane based materials and are considered to fall within the scope of the present invention.

The invention will further be illustrated in the following, non-limitative examples, it being understood that these examples are to be illustrative only and that the invention is not intended to be limited to the materials, conditions, process parameters and the like recited herein.

EXAMPLE 1

Preparation of $Br(Et_2Si)_5Br$ and Conversion to $EtO(Et_2Si)_5OEt$

In a dried, $N_2$-purged flask, 2.0 g of pure $(Et_2Si)_5$ (obtained by reaction of $Et_2SiCl_2$ with Na in toluene followed by equilibration of the mixture of cycles formed with K metal in dry tetrahydrofuran (vide C. Carlson et al., *Organometallics* 2, 1792 (1983))) (4.6 mmol) was dissolved in 30 ml dry benzene. To this was added 0.24 ml (4.6 mmol) of liquid bromine. The color of the bromine disappeared immediately upon contact with the solution containing the cyclopolysilane, indicating a rapid reaction. Gas chromatographic analysis indicated that a mixture of products was formed with the title compound present to the extent of about 80%. This mixture was immediately treated with 10 ml anhydrous ethanol and 1 eq. of dry pyridine to convert the terminal bromine substitution to ethoxyl substitution. An immediate precipitate of pyridinium hydrobromide was formed (identified by its water solubility). After stirring overnight at room temperature, the precipitated salt was removed by filtration and the solvent removed from the filtrate at reduced pressure to afford a viscous colorless oil. Proton NMR analysis of this oil showed an ethyl to ethoxyl ratio of 4.97:1, consistent with an essentially quantitative replacement of bromine with ethoxyl. This product was shown by gas chromatographic analysis to about 80% $EtO(Et_2Si)_5OEt$, as expected. This product could be purified by distillation to yield nearly pure $EtO(Et_2Si)_5OEt$, but was most conveniently utilized in its 80% pure state for the purposes of this invention. Similar ring opening reactions using thionyl chloride reacting with dodecamethylcyclohexasilane to produce 1,6-dichlorododecamethylhexasilane are known from the prior art (K. Oka, et al., *Chemistry Express,* 2, 699 (1987)). Ring opening reactions with iodine to yield the corresponding diiodo compounds have also been reported (H. Watanabe, et al., *Bull Chem. Soc. Japan*, 60, 769 (1987)).

EXAMPLE 2

Preparation of $Br(PhMeSi)_6Br$ and $MeO(PhMeSi)_6OMe$

A sample of 5 g (6.9 mmol) of solid all-trans $(PhMeSi)6$ (obtained by crystallization from ethyl acetate of the crude oligomer fraction from a polymerization of $PhMeSiCl_2$ with Na metal—see J. M. Zeigler, L. A. Harrah, "Polysilane Positive Photoresist Materials and Methods for Their Use," U.S. Pat. No. 4,588,801; J. M. Zeigler, "Interrupted Polysilanes Useful as Photoresists," U.S. Pat. No. 4,761,464 for typical procedures. These disclosures are hereby incorporated by reference) was treated with 1 eq. bromine in 25 ml dry benzene in a manner analogous to that in Example 1. After stirring overnight the crude dibromo compound was isolated by removing the solvent at reduced pressure. Thin layer chromatographic analysis showed the product to contain a single compound, presumed to be the title compound. This was redissolved in tetrahydrofuran (25 ml), 1 eq. dry pyridine added, followed by 10 ml methanol. A small amount of white precipitate formed immediately. After stirring this mixture overnight at room temperature, hexanes (25 ml) were added to precipitate the pyridinium hydrobromide formed in the reaction and the resulting precipitate removed by filtration. Removal of the solvents from the filtrate at reduced pressure afforded the crude dimethoxy compound in essentially quantitative yield. NMR analysis of this product showed it to have the expected ratio of aromatic to methyl protons, aside from a small contaminant of methanol.

EXAMPLE 3

Cohydrolysis of $EtO(Et_2Si)_5OEt$ with Tetraethylorthosilicate (TEOS)—Formation of Hybrid Sol-gel Material.

The acid catalyzed cohydrolysis is carried out essentially as described in Wilkes, et al., *Silicon-Based Polymer Science: A Compehensive Resource*, J. M. Zeigler and F. G. Fearon, Eds., American Chemical Society, Washington, D.C., 1990 p. 207 and in Wilkes, et al., in *Inorganic and Organometallic Polymers*, M. Zeldin, K. J. Wynne, and H. R. Alcock, Eds., American Chemical Society, Washington, D.C., 1988, p. 354, using molar ratios of the polysilane: $TEOS:H_2O$: HCl of 2:100:200:4 at ambient temperature. A viscous solution is formed which can be spread into thin films by brushing or with a doctor blade.

EXAMPLE 4

The ratios of the reactants in this reaction can be modified in wholly conventional manners to obtain hybrid materials with different optical densities at given wavelengths or with different mechanical properties to achieve a material with the proper balance of properties for the desired application. In particular, for non-linear optical applications where a photostable material is desired, the polysilane will be chosen to have at least one of the two substituents on silicon be aryl; when a photocurable material is desired, the preferred polysilane will have alkyl and/or silyl substituents. Low opitical densities will be achieved by having a low polysilane content; high photocuring efficiency will obtain from having a high content of polysilane or, of course, the analogous germane or silane-germane polymers.

EXAMPLE 5

Photolysis of the TEOS Sol-Gel bearing Gel-O-(Et$_2$Si)$_5$-O-Gel functionality

A thin film of the hybrid sol-gel material prepared in example 3 spread on glass is exposed to 2537 Å A radiation from low pressure Hg lamps in a Rayonet photochemical reactor for 10 min. A clear, hard film is formed.

EXAMPLE 6

Cohydrolysis of EtO(Et$_2$Si)$_5$OEt and $\alpha\omega$-dihydroxypolydiphenylsiloxane with Tetraethylorthosilicate (TEOS)—Formation of A Ternary Hybrid Sol-Gel Material The reaction is carried out as in Example 3, except that an equal weight to that of the polysilane of MW 4000 $\alpha\omega$-dihydroxypolydiphenylsiloxane is included in the mixture. The resulting viscous material forms hard films upon irradiation with UV as thin films as in Example

EXAMPLE 7

Cohydrolysis of Br(PhMeSi$_x$(n-Bu$_2$Ge)$_y$)Br with Tetraethylorthosilicate (TEOS)—Formation of Hybrid Sol-gel Material A mixture of the liquid oligomers from a Na-mediated copolymerization of PhMeSiCl$_2$ with n-Bu$_2$GeCl$_2$ was brominated with 1 eq. of bromine as in Example 1. The crude bromides were reacted directly with TMOS as in Example 3 to give a poly(silanegermane) containing hybrid sol-gel. This is crosslinkable as in Example 5 with UV radiation.

Although the networks and matrices in accordance with the present invention and the methods in accordance with the present invention have been described in connection with preferred embodiments, it will be appreciated by those skilled in the art that additions, modifications, substitutions and deletions not specifically described may be made without departing from the spirit and the scope of the invention defined in the appended claims.

What is claimed is:

1. A process for preparing a sol-gel like hybrid material, comprising copolymerizing esters selected from the group consisting of orthosilicate esters and mixtures of orthosilicate and orthotitanate esters, with a polymer selected from the groups consisting of linear polysilanes, linear polygermanes, and linear silane-germane copolymers.

2. A process as in claim 1, wherein said process further comprises including in the polymerization of said sol-gel hybrid a polymer selected from the group consisting of methyl silicone, phenyl silicone, polyaryl sulfide, polyaryl ethers and rubbery polysilanes, producing thereby a ternary hybrid structure.

3. A process as in claim 1, wherein said linear polysilane, linear polygermane, or linear silane-germane copolymer is of the formula:

$$X-(MR_1R_2)_n-X$$

wherein X is a halogen, M is silicon or germanium or a mixture of these elements, R$_1$ and R$_2$ are selected from the group of radicals consisting of alkyl, aryl, and silyl, and n is from 3 to 100.

4. A process as in claim 3, wherein X is selected from the group of elements consisting of chlorine and bromine.

5. The process as in claim 4, wherein R$_1$ is methyl and R$_2$ is selected from chemical groups consisting of alkyl and aryl.

6. A process as in claim 3, wherein M is silicon.

7. A process as in claim 1, wherein said linear polysilane, linear polygermane, or linear silane-germane copolymer is of the formula $$RO(MR_1R_2)_n-OR$$

wherein M is silicon, germanium, or a mixture of these elements, R is an alkyl or aryl group, R$_1$ is an alkyl or aryl group, R$_2$ is an alkyl, aryl, or silyl group, and n is from 3 to 100.

8. A process as in claim 7, wherein R is an alkyl or aryl group.

9. A process as in claim 7, wherein R is selected from the group of chemical groups consisting of methyl and ethyl.

10. A process as in claim 7, wherein R$_1$ is methyl and R$_2$ is selected from chemical groups consisting of alkyl, aryl and silyl.

11. A process as in claim 7, wherein R$_1$ and R$_2$ are each selected from the group of chemical groups consisting of alkyl, aryl, and silyl.

12. A process as in claim 7, wherein M is silicon.

13. A hybrid sol-gel comprising an orthosilicate or mixed orthosilicate-orthotitanate ester network having linear polymers of the formula:

$$X-(MR_1R_2)_n-X$$

substantially bonded therein, wherein X constitutes an oxygen atom which is part of the sol-gel network, M is silicon or germanium or a mixture of these elements, R$_1$ and R$_2$ are selected from the group of chemical groups consisting of alkyl, aryl and silyl and n is from 3 to 100.

14. A hybrid sol-gel as in claim 13, formed from X—(MR$_1$R$_2$)$_n$—X wherein X is selected from the group of elements consisting of chlorine and bromine.

15. A hybrid sol-gel as in claim 13, formed from X—(MR$_1$R$_2$)$_n$—X wherein X comprises RO and R is an alkyl or aryl group.

16. A hybrid sol-gel as in claim 15, wherein R is an alkyl group.

17. A hybrid sol-gel as in claim 16, wherein R is selected from the group of chemical groups consisting of methyl and ethyl.

18. A hybrid sol-gel as in claim 15, wherein R$_1$ is methyl and R$_2$ is selected from chemical groups consisting of alkyl and aryl.

19. A hybrid sol-gel as in claim 18, wherein R$_1$ is methyl and R$_2$ is selected from the group of chemical groups consisting of alkyl, aryl, and silyl.

20. A hybrid sol-gel as in claim 15, wherein in said network further comprises a substantially bonded-in polymer selected from the group consisting of methyl silicone, phenyl silicone, polyaryl sulfide, polyaryl ethers and rubbery polysilanes.

21. A hybrid sol-gel as in claim 13, wherein R$_1$ is alkyl or aryl and R$_2$ is aryl.

22. A hybrid sol-gel comprising an orthosilicate or mixed orthosilicate-orthotitanate ester network having incorporated therein substantially linear polygermanes of the formula:

$$RO-(GeR_1R_2)_n-OR$$

wherein R is alkyl or aryl group, $R_1$ is an alkyl, aryl, or silyl group, $R_2$ is an alkyl, aryl or silyl group, and n is from, 3 to 100.

23. A hybrid sol-gel as in claim 22, wherein $R_1$ is alkyl or aryl and $R_2$ is aryl.

24. A hybrid sol-gel comprising an orthosilicate or mixed orthosilicate orthotitanate ester network having incorporated therein substantially linear germane-silane copolymers of the formula:

$$RO\text{—}(MR_1R_2)_n\text{—}OR$$

wherein M is a mixture of silicon and germanium, R is an alkyl or aryl group, $R_1$ is an alkyl, aryl or silyl group, $R_2$ is an alkyl, aryl or silyl group and n is from 3 to 100.

25. A hybrid sol-gel as in claim 23, wherein $R_1$ is alkyl or aryl and $R_2$ is aryl.

26. A hybrid sol-gel as in claim 24 having linear polysilanes, linear polygermanes or copolymers thereof bonded therein and at least one member bonded therein from the group consisting of methyl silicone, phenyl silicone, polyaryl sulfide, polyaryl ethers and rubbery polysilanes.

27. A waveguide comprised of a hybrid sol-gel comprising an orthosilicate or mixed orthosilicate-orthotitanate ester network having linear polymers of the formula:

$$X\text{—}(MR_1R_2)_n\text{—}X$$

substantially bonded therein, wherein X constitutes an oxygen atom which is part of the sol-gel network, M is silicon or germanium or a mixture of these elements, $R_1$ and $R_2$ are selected from the group of chemical groups consisting of alkyl, aryl and silyl and n is from 3 to 100.

28. A waveguide comprised of a hybrid sol-gel comprising an orthosilicate or mixed orthosilicate-orthotitanate ester network having incorporated therein substantially linear polygermanes of the formula:

$$RO\text{—}(GeR_1R_2)_n\text{—}OR$$

wherein R is alkyl or aryl group, $R_1$ is an alkyl, aryl, or silyl group, $R_2$ is an alkyl, aryl or silyl group, and n is from 3, to 100.

29. A waveguide comprised of a hybrid sol-gel comprising an orthosilicate or mixed orthosilicate-orthotitanate ester network having incorporated therein substantially linear germanesilane copolymers of the formula:

$$RO\text{—}(MR_1R_2)_n\text{—}OR$$

wherein M is a mixture of silicon and germanium, R is an alkyl or aryl group, $R_1$ is an alkyl, aryl or silyl group, $R_2$ is an alkyl, aryl or silyl group and n is from 3 to 100.

30. A waveguide comprised of the hybrid sol-gel of claim 21.

* * * * *